UNITED STATES PATENT OFFICE.

ERNST SCHERING, OF CHARLOTTENBURG, PRUSSIA, GERMANY, ASSIGNOR TO BACHRACH & BRO., OF BALTIMORE, MARYLAND.

PREPARATION OF COLLODION.

SPECIFICATION forming part of Letters Patent No. 299,857, dated June 3, 1884.

Application filed November 21, 1883. (No specimens.) Patented in Germany April 7, 1878, No. 2,660.

*To all whom it may concern:*

Be it known that I, ERNST SCHERING, a subject of the King of Prussia, and a resident of the city of Charlottenburg, Prussia, have invented certain new and useful Improvements in a Composition of Matter termed Celloidine, to be used in the preparation of collodion which is neither explosive nor spontaneously ignitible, of which the following is a specification.

The preparation of a composition for making collodion which is neither explosive nor liable to spontaneous combustion, and which gives a peculiarly fine and extremely sensitive film for photographic purposes, was patented in the German Empire April 7, 1878, No. 2,660, Class 12. I have succeeded in preparing this improved pyroxyline in a perfectly harmless form, which can be sent by mail and transported without any risk whatever. The preparation of this article consists in dissolving any pure collodion cotton, (free from acid,) in ether and alcohol, which solution may and usually does contain more or less sediment, and from which it may be freed, as well as from its solvents, by distillation, after previous filtration, by any of the customary methods, to such an extent as to admit of the mass being cast into forms of any desired size, which shall contain a certain proportion of pure pyroxyline. These packets, when recently prepared, contain no ether, but only a small proportion of alcohol of about ninety per cent. in strength, which packets, on being ignited, burn slowly like weak alcohol.

This composition, when freshly made, is an elastic compact mass, has all the properties of pure collodion cotton of an extremely-fine quality and very sensitive film, can neither be exploded by ignition nor by concussion, and spontaneous combustion is impossible. When heated in an open glass tube, the alcohol is driven off, and the mass becomes solid without ignition. When it dries by evaporation, it forms a solid compact mass, like a hard gum, which, if ignited, will burn slowly, like paper. In this condition, cut up into fine shreds, it is best suited for making collodion of a very superior quality for photographic purposes.

This composition, on being dissolved in ether and alcohol, makes a collodion of extraordinary clearness, extremely fine structure, and of far greater sensitiveness than that made with the ordinary pyroxylines not treated in the method described.

I claim—

A new and improved composition of matter intended for the preparation of collodion, as hereinbefore described, which is elastic and transparent while fresh, and becomes hard on drying, and is neither explosive on concussion nor spontaneously combustible, and is therefore free from danger in transportation.

In testimony that I claim the foregoing as my invention I have signed my name in presence of two subscribing witnesses.

E. SCHERING.

Witnesses:
B. ROI,
G. H. SMITH.